US006957816B2

(12) United States Patent
Blease et al.

(10) Patent No.: US 6,957,816 B2
(45) Date of Patent: Oct. 25, 2005

(54) LOOP SEAL FOR KNIFE GATE VALVE

(75) Inventors: Kevin J. Blease, Easton, PA (US); Richard R. Weston, Nazareth, PA (US)

(73) Assignee: Victaulic Company of America, Easton, PA (US)

( * ) Notice: Subject to any disclaimer, the term of this patent is extended or adjusted under 35 U.S.C. 154(b) by 0 days.

(21) Appl. No.: 10/613,804

(22) Filed: Jul. 3, 2003

(65) Prior Publication Data

US 2005/0001195 A1 Jan. 6, 2005

(51) Int. Cl.[7] .................................... F16L 17/00
(52) U.S. Cl. ...................... 277/602; 277/628; 277/608; 277/616; 251/327
(58) Field of Search ................................ 277/602–616, 277/628; 251/327, 358

(56) References Cited

U.S. PATENT DOCUMENTS

| | | | | |
|---|---|---|---|---|
| 1,381,938 A | | 6/1921 | Sheafor | |
| 2,007,036 A | | 7/1935 | Cornell, Jr. | 137/75 |
| 2,732,170 A | | 1/1956 | Shand | 251/172 |
| 2,913,220 A | | 11/1959 | Cover | 251/328 |
| 3,198,484 A | | 8/1965 | Martindale | 251/329 |
| 3,293,342 A | | 12/1966 | Grove | 264/157 |
| 3,442,286 A | | 5/1969 | Anderson et al. | 137/246.22 |
| 3,941,349 A | | 3/1976 | Pierson | 251/100 |
| 3,992,929 A | | 11/1976 | Connell | 72/106 |
| 4,062,516 A | | 12/1977 | Grove | 251/174 |
| 4,257,447 A | | 3/1981 | Clarkson | 137/375 |
| 4,326,698 A | | 4/1982 | Constantino | 251/327 |
| 4,623,122 A | | 11/1986 | Gambetta | 251/328 |
| 4,688,597 A | | 8/1987 | Clarkson et al. | 137/375 |
| 5,004,210 A | | 4/1991 | Sarno | 251/279 |
| 5,020,776 A | | 6/1991 | Owens et al. | 251/327 |
| 5,069,248 A | | 12/1991 | Gill | 137/613 |
| 5,082,247 A | | 1/1992 | Owens et al. | 251/326 |
| 5,197,512 A | | 3/1993 | Lev | 137/375 |
| 5,271,426 A | | 12/1993 | Clarkson et al. | 137/375 |
| 5,330,158 A | | 7/1994 | Ellich et al. | 251/327 |
| 5,338,006 A | | 8/1994 | McCutcheon et al. | 251/327 |
| 5,346,230 A | * | 9/1994 | Schumacher et al. | 277/551 |
| 5,370,149 A | | 12/1994 | Clarkson et al. | 137/375 |
| 5,413,140 A | | 5/1995 | Kimpel et al. | 137/375 |
| 5,560,587 A | * | 10/1996 | McCutcheon et al. | 251/327 |
| 5,769,125 A | | 6/1998 | Duer et al. | 137/844 |
| 5,890,700 A | | 4/1999 | Clarkson et al. | 251/327 |
| 5,897,119 A | * | 4/1999 | Mcmillen | 277/562 |
| 6,422,535 B1 | | 7/2002 | Stone et al. | 251/327 |

* cited by examiner

*Primary Examiner*—Enoch E. Peavey
(74) *Attorney, Agent, or Firm*—Synnestvedt & Lechner LLP

(57) ABSTRACT

A seal for use with a knife gate valve is disclosed, the seal having a loop to which is attached an axially facing sealing lobe. A sealing surface is positioned on the sealing lobe, the sealing surface having an axially projecting leading edge and flanking annular sealing surfaces oriented angularly. Axial and inner channels extend around the loop and provide space for the loop to deform when the sealing lobe is compressed. A reinforcing band is encapsulated within the loop to stiffen it against buckling when compressed by forces acting across the leading edge. The seal is used in facing pairs with the sealing lobes being compressed against one another to form a radial seal when the valve is open. The seal is made from a flexible, resilient elastomeric compound; the band is metal.

19 Claims, 4 Drawing Sheets

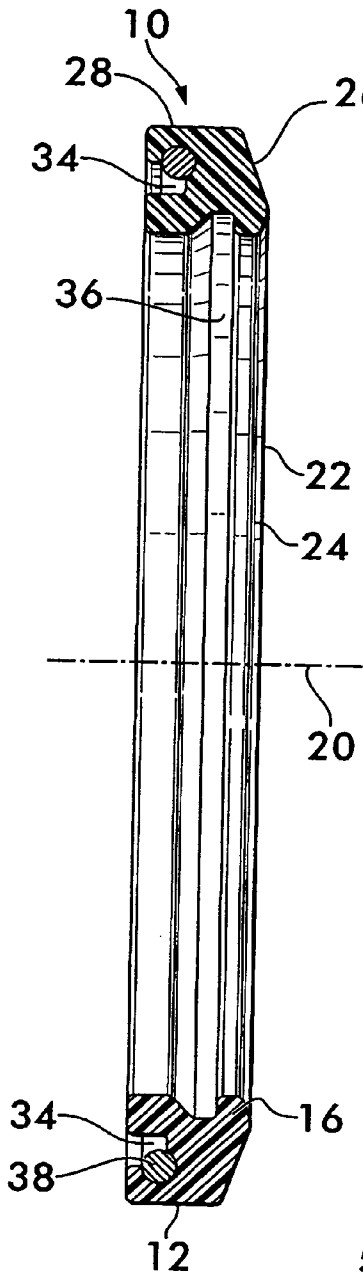
FIG.2
FIG.3A
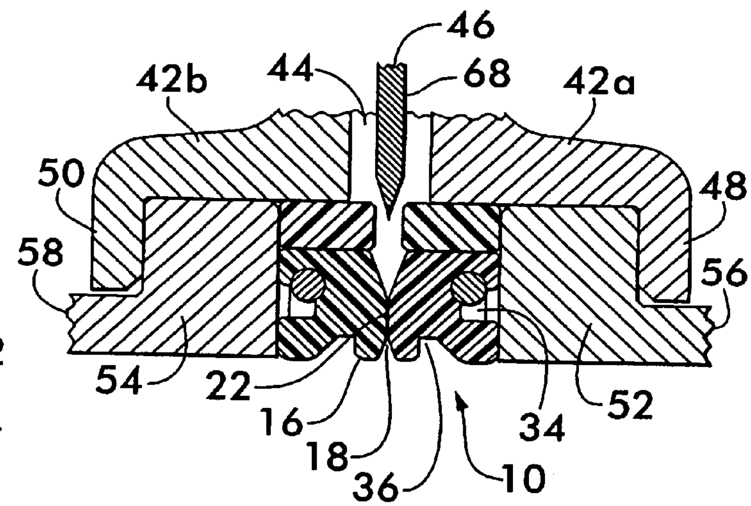
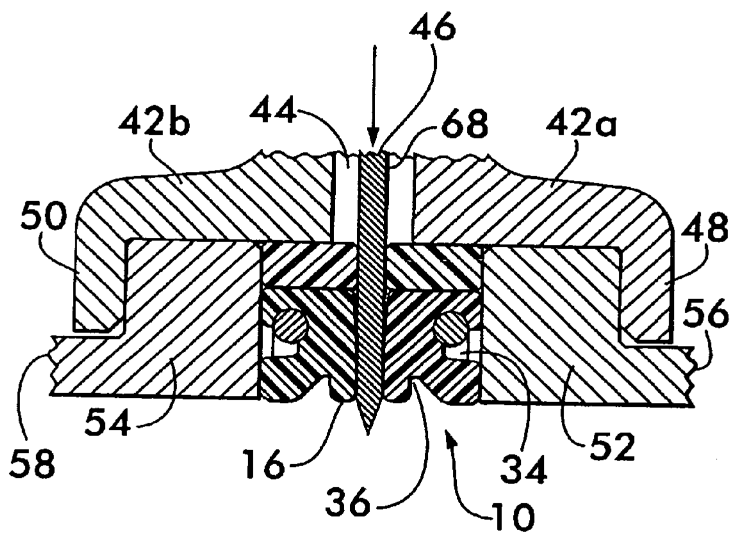
FIG.3B

LOOP SEAL FOR KNIFE GATE VALVE

FIELD OF THE INVENTION

This invention relates to seals used in valves to control fluid flow and especially to seals useable in knife gate valves.

BACKGROUND OF THE INVENTION

Knife gate valves are useful in a wide variety of fluid control applications, for example, in the petroleum and chemical industries, mining, power generation, as well as municipal and industrial water service utilities, wherever there is a need for a valve with a high flow capacity and relatively low head loss to control flows which need not be throttled.

Knife gate valves are generally understood as comprising a housing, which permits the valve to be positioned in a fluid conduit line, and a movable valve member in the form of a flat plate (the knife gate) that is slidably movable within the housing. The gate is movable transversely to the fluid flow direction between an open position, wherein the gate is removed from the fluid flow path through the housing to allow fluid flow through the valve, and a closed position, wherein the gate is inserted into the fluid flow path to block the fluid flow.

Resilient seated knife gate valves use pairs of seals mounted within the housing on opposite sides of and adjacent to the gate. The seals extend circumferentially around the fluid flow path. When the gate is in the closed position, the seals compressively engage its opposing surfaces and prevent leakage of fluid past the gate. When the knife gate is in the open position, the seals compressively engage one another around the fluid flow path and provide a radial seal which prevents leakage of fluid through the opening in the housing through which the gate moves.

Knife gate valves are normally operated in either a fully open or fully closed position. However, during valve opening and closing significant forces develop which tend to unseat and strip the seals from the housing. These forces include transient fluid dynamic forces which occur when the gate is partially open and the valve behaves as a venturi tube, causing accelerated fluid flow through the valve. Furthermore, the frictional forces between the seals and the gate generated when the gate moves between the seals impart significant shear forces to the seals tending to buckle them and strip them out of the housing and into the fluid flow path. The frictional forces arise largely due to the compressive engagement between the seals and the gate, which is required to ensure a fluid tight seal between them.

Seals for knife gates must endure significant compression, because they must be compressed against one another sufficiently to provide the radial seal preventing leakage when the valve is open, and then be compressed further to accommodate the knife gate when it is inserted between the seals to close the valve. The seals must endure linear compression on the order of 10% to effect the radial sealing of the valve, and further compression, up to approximately 30%, when compressively engaged by the gate.

The seals are advantageously formed of flexible, resilient material which is incompressible, i.e., if one portion of the seal is compressively deformed then another portion of the seal must be allowed to expand in reaction thereto. If the seals are not permitted room to expand, then they will not deform under the compressive loads of the gate and will transfer their compressive stress to the gate and the housing, preventing motion of the gate or damaging the housing or the seal.

In designing a seal for a knife gate valve, it is thus advantageous to develop a seal which is strong enough to resist unseating from the housing while being flexible and resilient so as to repeatedly deform as necessary to accommodate the motion of the gate and form an effective seal within the valve in both the open and closed configurations.

SUMMARY AND OBJECTS OF THE INVENTION

The invention concerns a seal positionable within a knife gate valve and engageable with a surface of a movable knife gate oriented transversely to an axial direction defining flow through the valve. The seal effects a fluid-tight closure of the valve and comprises a flexible, resilient loop positionable within the valve adjacent to the knife gate. The loop comprises a flexible, resilient sealing lobe which extends around the loop. Preferably, the loop is comprised of an elastomeric compound, although other flexible resilient materials such as natural rubber and thermoplastics are also feasible. The sealing lobe faces in the axial direction of the valve and has a deformable sealing surface engageable with the knife gate surface. A first channel extends around the loop and is positioned opposite to the sealing lobe, the first channel facing in the axial direction away from the sealing lobe. A second channel extends around the loop and is positioned adjacent to the sealing lobe, the second channel facing inwardly of the loop.

Preferably, a reinforcing band engages the loop and is positioned substantially within one of the first and second channels. The reinforcing band extends around the loop. Preferably, the reinforcing band is substantially encapsulated within the loop and has a toroidal shape. The reinforcing band is formed of a material having a greater modulus of elasticity than the material forming the loop.

The deformable sealing surface preferably comprises a leading edge projecting in the axial direction. A first annular surface extends inwardly of the loop from the leading edge and a second annular surface extends outwardly of the loop from the leading edge. Preferably, at least one of the annular surfaces is angularly oriented toward the first channel.

The invention also includes a knife gate valve having a knife gate movable within a housing to effect opening and closing of the valve, the knife gate having oppositely facing surfaces oriented transversely to an axial direction defining flow through the valve. The knife gate valve comprises a flexible, resilient loop mounted within the housing adjacent to the knife gate. The loop comprises a flexible, resilient sealing lobe which extends circumferentially around it. The sealing lobe faces in the axial direction and has a deformable sealing surface engageable with one of the knife gate surfaces to effect a fluid tight seal when the one surface is moved into engagement with the sealing lobe to close the valve. A first channel extends around the loop and is positioned opposite to the sealing lobe. The first channel faces in the axial direction away from the sealing lobe. A second channel extends around the loop and is positioned adjacent to the sealing lobe. The second channel faces inwardly of the housing.

Preferably, the knife gate valve includes a second flexible, resilient loop mounted within the housing adjacent to the knife gate. The second loop comprises a flexible, resilient sealing lobe, the lobe extending around the loop and facing in the axial direction. The lobe on the second loop has a deformable sealing surface engageable with the knife gate surface on the opposite side of the first loop to effect a fluid tight seal when the knife gate is moved into engagement with the sealing lobes to close the valve. Preferably, a channel extends around the second loop and is positioned opposite to the second loop's sealing lobe. The channel faces in the axial direction away from the sealing lobe. Another channel extends around the second loop and is positioned adjacent to the second loop's sealing lobe. The last mentioned channel faces inwardly of the housing.

The knife gate is movable from a closed position between the seals wherein the sealing lobes engage the oppositely facing surfaces of the gate, to an open position wherein the knife gate is removed from between the seals. The sealing lobes are positioned within the housing in facing relationship and engaging one another under compression so as to effect a radial seal around the housing. Preferably, both seals include respective reinforcing bands substantially encapsulated within the loops.

It is an object of the invention to provide a seal useable within a knife gate valve.

It is another object of the invention to provide a seal which can withstand significant axial compression.

It is yet another object of the invention to provide a seal which can provide a radial fluid tight joint.

It is still another object of the invention to provide a knife gate valve using a seal according to the invention.

These as well as other objects and advantages of the invention will become apparent upon consideration of the drawings and detailed description of preferred embodiments.

BRIEF DESCRIPTION OF THE DRAWINGS

FIG. 2 is a cross-sectional view taken at line 2—2 of FIG. 1;

FIGS. 3A and 3B are partial sectional views taken from within the circle 3A, 3B in FIG. 3 and shown on an enlarged scale.

DETAILED DESCRIPTION OF PREFERRED EMBODIMENTS

Figure 1:
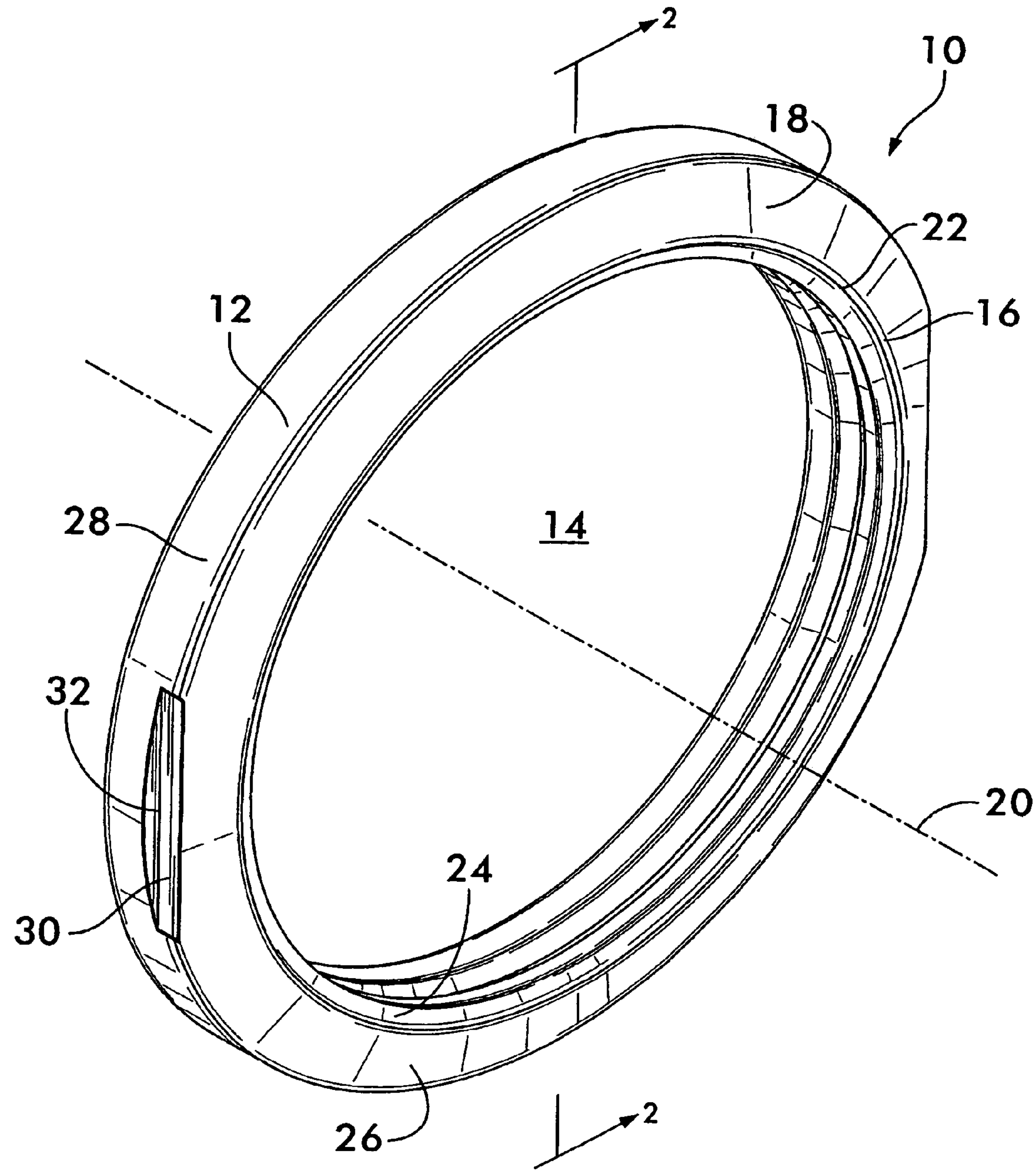
FIG. 1 is a perspective view of a knife gate valve seal according to the invention.

FIG. 1 shows a seal 10 according to the invention. Seal 10 comprises a flexible resilient loop 12 that defines a central bore 14. Loop 12 is preferably substantially circular in shape, but could also be oval, ellipsoidal, polygonal or any other shape defining a closed loop. The loop comprises a flexible, resilient sealing lobe 16 which extends around it. Sealing lobe 16 has a deformable sealing surface 18 that faces in an axial direction as defined by an axis 20 defining a flow path through bore 14 of loop 12. Sealing surface 18 comprises a leading edge 22 projecting in the axial direction. Annular sealing surfaces 24 and 26 extend from the leading edge 22, sealing surface 24 extending inwardly of loop 12 and sealing surface 26 extending outwardly of the loop. Annular sealing surfaces 24 and 26 are preferably angularly oriented with respect to the leading edge 22 for reasons explained below. Preferably, the annular sealing surfaces are substantially flat although other configurations are feasible.

Loop 12 also has an outwardly facing perimeteral surface 28 in which one or more flat regions 30 are positioned. The flat regions 30 of surface 28 are preferably positioned diametrically opposed from one another and are oriented substantially parallel to respective chord lines 32 through the loop 12. The flat regions 30 are engageable with complementary flat surfaces within a knife gate valve in which the seal 10 is mounted to orient the loop relative to the valve. Such flats provide the advantage of a more compact valve.

As best shown in FIG. 2, an axially facing channel 34 (called the "axial channel") is positioned within loop 12 axially opposite to the sealing lobe 16. Axial channel 34 extends around loop 12 and faces away from the sealing lobe 16. Another channel 36, known as the "inner channel", is positioned adjacent to the sealing lobe 16 and also extends around the loop 12. Inner channel 36 faces inwardly toward the axis 20. Together, the axial and inner channels 34 and 36 provide a free space into which the loop 12 may deform when the sealing lobe 16 is compressed when installed in a knife gate valve and performing its sealing function.

FIG. 2 further shows a reinforcing band 38, preferably positioned substantially within the axial channel 34 and substantially encapsulated within the loop 12. Reinforcing band 38 preferably extends substantially continuously around the loop 12 although it may also be discontinuous, as for example a split band. Reinforcing band 38 is preferably toroidal in shape and comprises a material having a greater modulus of elasticity than loop 12. The reinforcing band may be formed from metals such as steel and stainless steel, as well as engineering plastics, natural rubber, and elastomerics. The reinforcing band 38 is significantly stiffer than the loop 12 and provides support against buckling when the seal 10 is subjected to forces during valve operation. Reinforcing band 38 is preferably positioned within axial channel 34 for manufacturing reasons but the band would also be effective if positioned substantially within the inner channel 36 or entirely within or without the loop 12. Likewise, it is advantageous that the reinforcing band 38 be encapsulated by the material comprising the seal to prevent corrosion, but the band would still be effective if only partially encapsulated.

Preferably, loop 12 is comprised of an elastomeric compound to provide the needed resilience and flexibility to deform under compression and return to a nominal shape in order to effect a fluid tight seal. Thermoplastics such as urethanes are also feasible as is natural rubber. The seal 10 may be manufactured using compression molding techniques wherein the elastomeric compound is heated under compression in a cavity and core mold. Injection molding is also feasible and is preferred for large volume production which makes the capital expenses for the molds economically justifiable.

Figure 3:
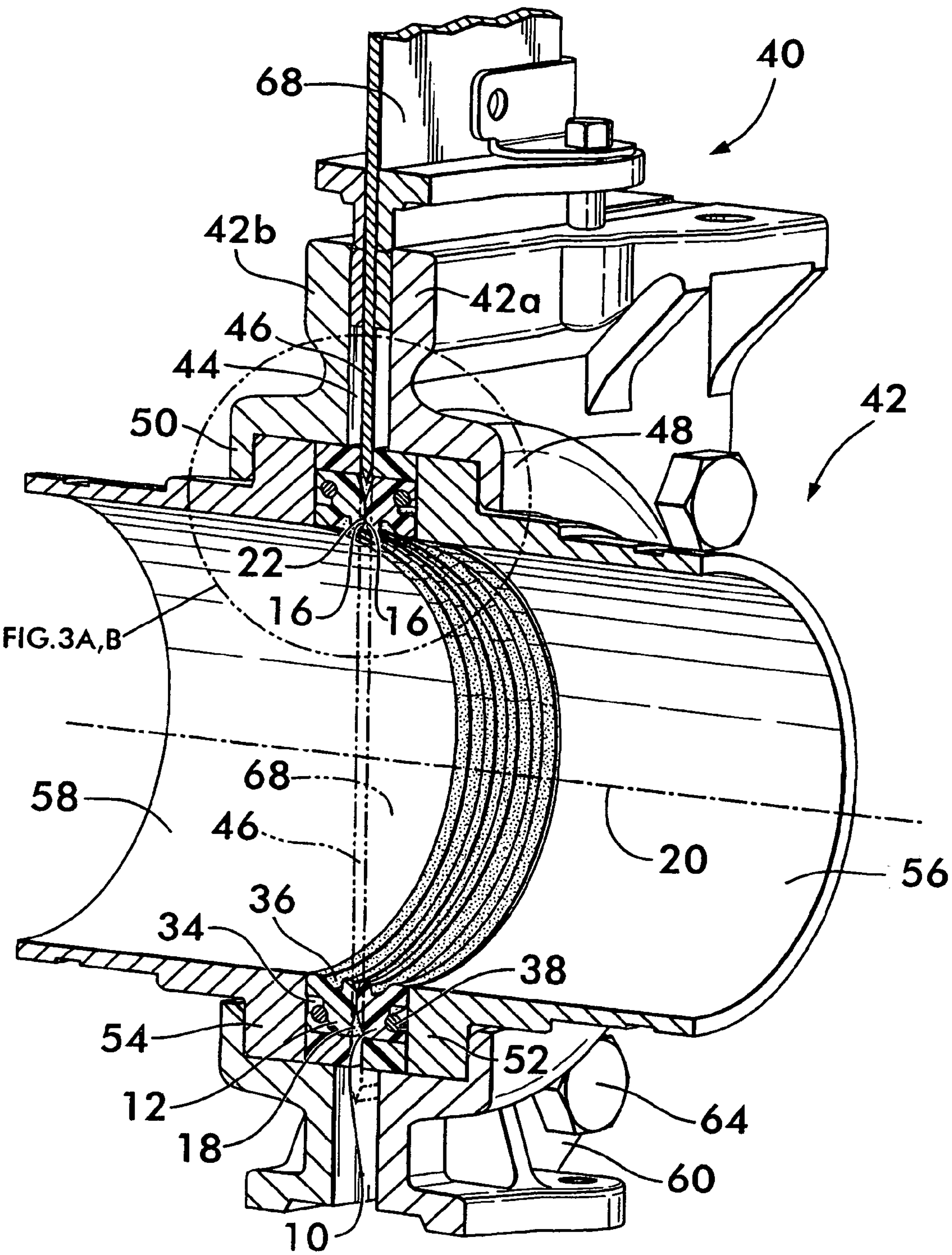
FIG. 3 is an elevational longitudinal perspective sectional view of a knife gate valve using a seal according to the invention.
Figure 4:
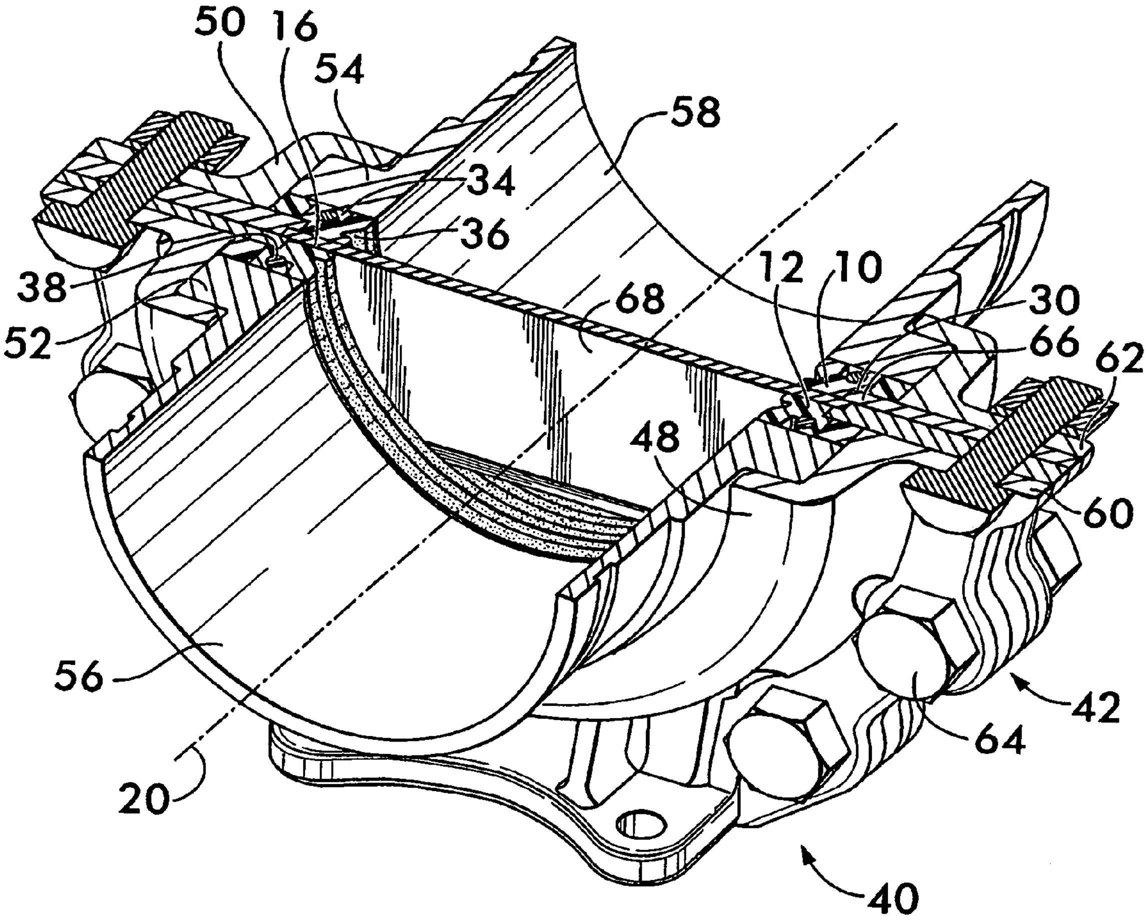
FIG. 4 is a plan longitudinal perspective sectional view of a knife gate valve using a seal according to the invention.

FIGS. 3 and 4 illustrate a knife gate valve 40 in which the seal 10 is used. Valve 40 has a housing 42 comprised of coaxially aligned housing portions 42*a* and 42*b* set apart from one another to providing a space 44 between them through which a knife gate 46 may be inserted. Housing portions 42*a* and 42*b* have flanges 48 and 50 which extend radially inwardly to capture outwardly extending flanges 52 and 54 on pipes 56 and 58 to secure the valve 40 to the pipes. Housing portions 42*a* and 42*b* also have outwardly extending flanges 60 and 62 which allow the portions to be bolted together by through bolts 64.

A pair of seals 10 is positioned within housing 42 between the pipe flanges 52 and 54. The seals 10 are aligned so that their respective sealing lobes 16 are in facing relation substantially coaxial with one another and axis 20 which defines the fluid flow path through valve 40. When the valve is open (i.e., the knife gate 46 is removed from the fluid flow path) as shown in FIG. 3A, the sealing lobes 16 compressively engage each other along their sealing surfaces 18. The degree of compression between the facing sealing lobes 16 is controlled by the relative dimensions of the various components of the valve 40. The degree of compression between the seals 10 must be such that the sealing lobes 16 form a radial seal preventing fluid flowing through the pipes 56 and 58 from leaking out through the space 44 between the housing portions 42*a* and 42*b* as well as between the seals 10 and the pipe flanges 52 and 54. The compression required to effect this radial seal can be substantial, for example, on the order of 10% linear compression. When the sealing lobes 16 are compressed against one another, the incompressible material comprising seals 10 deforms into the axial channels 34 and the inner channels 36 in the loops 12, thus permitting conforming deformation of the sealing lobes and an effective radial seal preventing leakage.

As shown in phantom line in FIG. 3 and in detail in FIG. 3B, when the valve is closed with the knife gate 46 blocking the fluid flow path, the sealing lobes 16 are placed under additional compression as they deflect axially to accommodate the knife gate 46 inserted between them. This additional compression may increase the total linear compression of the seals to around 30%. Again, the axial and inner channels 34 and 36 provide space for the material in the loops 12 to deform in response to the compression of the sealing lobes 16. When compressed against the knife gate 46, the sealing surface 18 of sealing lobes 16 engage the surfaces 68 on opposite sides of the knife gate 46, those surfaces 68 being oriented transversely to the axis 20 defining the fluid flow path.

Insertion of knife gate 46 between the seals 10 places considerable force transversely across the leading edges 22 of the sealing lobes 16. This force is due primarily to friction between the knife gate surface 68 and the sealing lobe 16. Closing of the valve will tend to push a part of the seals 10 downwardly into the fluid flow path, and opening of the valve will tend to pull a lower portion of the seals upwardly into the fluid flow path. If the seal buckles and unseats, the valve will leak and may require replacement of the seals. Transient fluid dynamic forces imposed on the seals, which occur during opening and closing of the valve, may also tend to unseat or pull the seals further into the fluid flow path. Two features of the seal 10 help avoid this failure mode. The reinforcing band 38 stiffens the seal and raises the critical buckling load beyond that which the seals are expected to see when the knife gate opens and closes. Furthermore, as best shown in FIG. 2, the outwardly extending annular sealing surfaces 26, being angularly oriented from the leading edges 22, act as guides to lead the knife gate 46 between the sealing lobes 16 and prevent direct compression loading by the knife gate 46 on the perimeteral surfaces 28 of the loops 12. The inwardly extending annular sealing surfaces 24 perform a similar guiding function on the lower portion of the sealing lobes 16, allowing the lobes to separate cleanly without being pinched as the valve closes.

As best shown in FIG. 4, flat regions 30 on the outwardly facing perimeteral surface 28 of loop 12 seat against complementary flat surfaces 66 within housing 42.

Use of seals according to the invention with knife gate valves is expected to provide a more effective seal which can withstand higher operating pressures without significant leakage and survive more opening and closing cycles of the valve before requiring replacement due to wear.

What is claimed is:

1. A knife gate valve having a knife gate movable within a housing to effect opening and closing of said valve, said knife gate having oppositely facing surfaces oriented transversely to an axial direction defining flow through said valve, said knife gate valve comprising:

a flexible, resilient loop mounted within said housing adjacent to said knife gate, said loop comprising:

a sealing lobe extending around said loop, said sealing lobe having a deformable sealing surface facing in said axial direction and being engageable with one of said knife gate surfaces to effect a fluid tight seal when said one surface is moved into engagement with said sealing lobe to close said valve;

a first channel extending around said loop and positioned opposite to said sealing lobe, said first channel facing in said axial direction away from said sealing lobe; and a second channel extending around said loop and positioned contiguous to said sealing lobe, said second channel facing inwardly of said housing.

2. A knife gate valve according to claim 1, wherein said loop has a substantially circular shape.

3. A knife gate valve according to claim 1, further comprising a reinforcing band positioned substantially within one of said first and second channels, said reinforcing band extending around said loop.

4. A seal according to claim 1, wherein said reinforcing band extends substantially completely around said loop.

5. A knife gate valve according to claim 3, wherein said reinforcing band is positioned substantially within said first channel.

6. A knife gate valve according to claim 5, wherein said reinforcing band is substantially encapsulated within said loop.

7. A knife gate valve according to claim 3, wherein said reinforcing band has a toroidal shape.

8. A knife gate valve according to claim 1, wherein said loop is formed from a material selected from the group consisting of natural rubber, elastomeric compounds and thermoplastics.

9. A knife gate valve according to claim 1, wherein said deformable sealing surface comprises:

a leading edge projecting in said axial direction; a first annular surface extending inwardly of said loop from said leading edge; and a second annular surface extending outwardly of said loop from said leading edge.

10. A knife gate valve according to claim 9, wherein one of said annular surfaces is angularly oriented toward said first channel.

11. A knife gate valve according to claim 9, wherein one of said annular surfaces is substantially flat.

12. A knife gate valve according to claim 1, further comprising:

another flexible, resilient loop mounted within said housing adjacent to said knife gate, said loop comprising:

another sealing lobe extending around said other loop, said other sealing lobe having another deformable sealing surface facing in said axial direction and being engageable with another of said knife gate surfaces to effect a fluid tight seal when said other surface is moved into engagement with said other sealing lobe to close said valve;

a third channel extending around said other loop and positioned opposite to said other sealing lobe, said third channel facing in said axial direction away from said other sealing lobe;

a fourth channel extending around said other loop and positioned contiguous to said other sealing lobe, said fourth channel facing inwardly of said housing; and said knife gate being movable from a closed position between said seals wherein said sealing lobes engage said oppositely facing surfaces, to an open position wherein said knife gate is removed from between said seals, said sealing lobes being positioned within said housing in facing relationship and engaging one another under compression so as to effect a seal around said housing.

13. A knife gate valve according to claim 12, wherein said other loop further comprising another reinforcing band positioned substantially within one of said third and fourth channels, said other reinforcing band extending around said other loop.

14. A knife gate valve according to claim 13, wherein said other reinforcing band is positioned substantially within said third channel.

15. A knife gate valve according to claim 14, wherein said other reinforcing band is substantially encapsulated within said other loop.

16. A knife gate valve according to claim 13, wherein said other reinforcing band has a toroidal shape.

17. A knife gate valve according to claim 12, wherein said other loop is formed from a material selected from the group consisting of natural rubber, elastomeric compounds and thermoplastics.

18. A knife gate valve according to claim 12, wherein said other deformable sealing surface comprises: another leading edge projecting in said axial direction; a third annular surface extending inwardly of said other loop from said other leading edge; and a fourth annular surface extending outwardly of said other loop from said other leading edge.

19. A knife gate valve according to claim 18, wherein one of said third and fourth annular surfaces is angularly oriented toward said third channel.

* * * * *